(12) United States Patent
Choi (10) Patent No.: US 9,397,329 B2
(45) Date of Patent: Jul. 19, 2016

(54) RECHARGEABLE BATTERY HAVING LEAD TAB

(71) Applicant: SAMSUNG SDI CO., LTD., Yongin-si, Gyeonggi-do (KR)

(72) Inventor: Bum-Kuk Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/598,661

(22) Filed: Jan. 16, 2015

(65) Prior Publication Data

US 2015/0287972 A1    Oct. 8, 2015

(30) Foreign Application Priority Data

Apr. 4, 2014  (KR) ......................... 10-2014-0040811

(51) Int. Cl.
*H01M 2/00* (2006.01)
*H01M 2/22* (2006.01)
*H01M 10/42* (2006.01)

(52) U.S. Cl.
CPC ............ *H01M 2/22* (2013.01); *H01M 10/4257* (2013.01); *H01M 2010/4271* (2013.01)

(58) Field of Classification Search
None
See application file for complete search history.

(56) References Cited

U.S. PATENT DOCUMENTS

| 2008/0226974 A1* | 9/2008 | Jang .................... H01M 2/0215 429/121 |
| 2009/0305118 A1* | 12/2009 | Kim .................... H01M 2/0207 429/93 |
| 2010/0136418 A1 | 6/2010 | Jang et al. |
| 2011/0064975 A1 | 3/2011 | Koh et al. |
| 2011/0123837 A1* | 5/2011 | Baek .................. H01M 2/0257 429/7 |
| 2012/0064377 A1* | 3/2012 | Ro ....................... H01M 2/1022 429/7 |
| 2013/0149562 A1 | 6/2013 | Lee et al. |

FOREIGN PATENT DOCUMENTS

| KR | 10-2009-0097267 A | 9/2009 |
| KR | 10-2008-0120623 | 6/2010 |
| KR | 10-2010-0062166 A | 6/2010 |
| KR | 10-2013-0065289 A | 6/2013 |

* cited by examiner

*Primary Examiner* — Patrick Ryan
*Assistant Examiner* — Jose Colucci Rios
(74) *Attorney, Agent, or Firm* — Lee & Morse, P.C.

(57) ABSTRACT

A rechargeable battery includes an electrode assembly including a first electrode, a second electrode, and a separator, the separator being between the first electrode and the second electrode, a case including a space that receives the electrode assembly therein, a cap plate coupled with an opening of the case, a top cover covering the cap plate, a protective circuit module between the cap plate and the top cover, and a lead tab that electrically connects the protective circuit module and the cap plate. The lead tab includes fixing protrusions and the top cover includes fixing grooves into which the fixing protrusions are inserted.

16 Claims, 13 Drawing Sheets

RECHARGEABLE BATTERY HAVING LEAD TAB

CROSS-REFERENCE TO RELATED APPLICATION

Korean Patent Application No. 10-2014-0040811, filed on Apr. 4, 2014, in the Korean Intellectual Property Office, and entitled: "Rechargeable Battery Having Lead Tab," is incorporated by reference herein in its entirety.

BACKGROUND

1. Field

Embodiments relate to a rechargeable battery having a lead tab.

2. Description of the Related Art

A rechargeable battery is a battery that can be repeatedly charged and discharged, unlike a primary battery that is incapable of being recharged. A low-capacity rechargeable battery is used for small portable electronic devices such as a mobile phone, a laptop computer, and a camcorder. A large-capacity rechargeable battery is widely used as a power supply for driving a motor such as a hybrid vehicle.

Representative rechargeable batteries include nickel-cadmium (Ni—Cd) rechargeable batteries, nickel-hydrogen (Ni—MH) rechargeable batteries, lithium (Li) rechargeable batteries, and lithium ion (Li-ion) rechargeable batteries. The operating voltage of a lithium ion rechargeable battery is approximately 3 times higher than that of a nickel-cadmium battery or nickel-hydrogen battery that has been mainly used to power portable electronic equipment. The lithium ion rechargeable battery has been widely used due to advantages in terms of energy density per unit weight.

A lithium-based rechargeable battery generally uses a lithium-based oxide as a positive electrode active material and a carbon material as a negative electrode active material. Generally, a rechargeable battery may be classified into a liquid electrolyte battery and a polymer electrolyte battery depending on the kind of the electrolyte. A lithium-based rechargeable battery using a liquid electrolyte is referred to as a lithium ion battery and a battery using a polymer electrolyte is referred to as a lithium polymer battery.

SUMMARY

Embodiments are directed to a rechargeable battery including an electrode assembly including a first electrode, a second electrode, and a separator, the separator being between the first electrode and the second electrode, a case including a space that receives the electrode assembly therein, a cap plate coupled with an opening of the case, a top cover covering the cap plate, a protective circuit module between the cap plate and the top cover, and a lead tab that electrically connects the protective circuit module and the cap plate. The lead tab includes fixing protrusions and the top cover includes fixing grooves into which the fixing protrusions are inserted.

The lead tab may include an upper bonding part attached to the protective circuit module, a lower bonding part fixed on the cap plate, and a connection plate bent downwardly from the upper bonding part to connect the upper bonding part and the lower bonding part.

The fixing protrusions may protrude at side ends of the upper bonding part.

The lead tab may include buffering members that extend toward the cap plate from side ends of the upper bonding part, the buffering members being spaced apart from a top surface of the cap plate.

The fixing protrusions may protrude from the buffering members.

The lead tab may include a buffering member that is bent toward the cap plate from an end of the upper bonding part and that is spaced apart from a top surface of the cap plate. The fixing protrusions may protrude from side ends of the buffering member.

The top cover may include a supporting plate and a sidewall protruding toward the cap plate from the supporting plate. The fixing grooves may be in the sidewall.

The sidewall may include guide grooves that are connected with the fixing grooves and extend to a bottom end of the sidewall.

The protective circuit module may include a plurality of outer terminals. The top cover may include a plurality of holes exposing the outer terminals.

The lead tab may include buffering members that are bent toward the cap plate from an end of the upper bonding part. The lead tab may include first fixing protrusions that protrude from the upper bonding part and second fixing protrusions that protrude from the buffering members. The sidewall may include first fixing grooves into which the first fixing protrusions are inserted and second fixing grooves into which the second fixing protrusions are inserted.

The lower bonding part may be welded to the cap plate.

The lower bonding part may include a screw hole into which a screw is insertable.

An insulation case may be between the electrode assembly and the cap plate.

Embodiments are also directed to a rechargeable battery including an electrode assembly including a first electrode, a second electrode, and a separator, the separator being between the first electrode and the second electrode, a case including a space that receives the electrode assembly therein, a cap plate coupled with an opening of the case, a top cover covering the cap plate, a protective circuit module between the cap plate and the top cover, and a lead tab that electrically connects the protective circuit module and the cap plate, the lead tab including a buffering member that protrudes and extends toward the cap plate, the buffering member being spaced apart from a top surface of the cap plate.

The lead tab may include an upper bonding part attached to the protective circuit module, a lower bonding part fixed on the cap plate, and a connection plate bent downwardly from the upper bonding part to connect the upper bonding part and the lower bonding part. The buffering member may be plural in number. Each buffering member may have a bar shape and extend toward the cap plate from a respective side end of the upper bonding part.

The lead tab includes an upper bonding part attached to the protective circuit module, a lower bonding part fixed on the cap plate, and a connection plate bent downwardly from the upper bonding part to connect the upper bonding part and the lower bonding part. The buffering member may have a plate shape. The buffering member may be bent toward the cap plate from an end of the upper bonding part.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer or element is referred to as being "between" two layers or elements, it can be the only layer between the two layers or elements, or one or more intervening layers or elements may also be present. Like reference numerals refer to like elements throughout.

Figure 1:
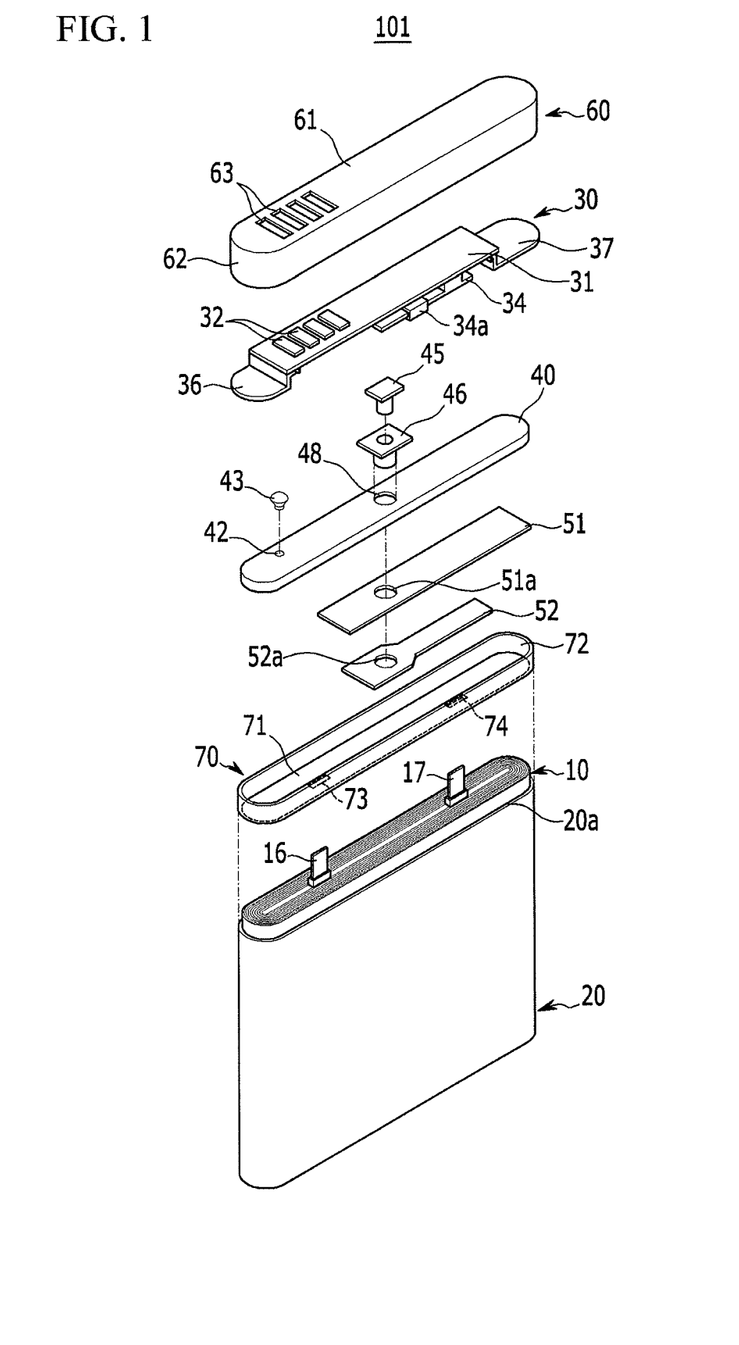
FIG. 1 illustrates an exploded perspective view showing a rechargeable battery according to an exemplary embodiment.
Figure 2:
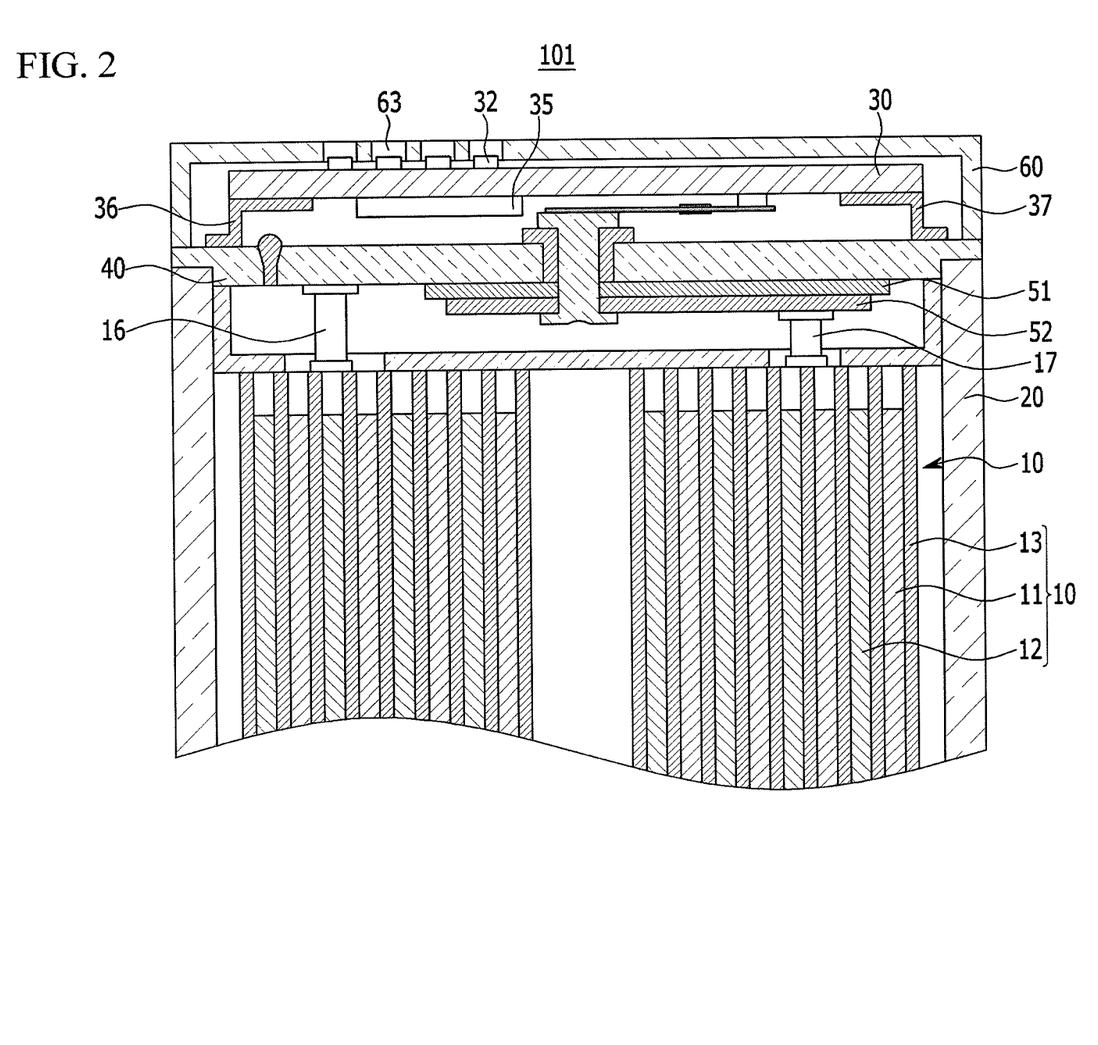
FIG. 2 illustrates a longitudinal cross-sectional view of the rechargeable battery.

FIG. 1 illustrates an exploded perspective view showing a rechargeable battery according to an exemplary embodiment, and FIG. 2 illustrates a longitudinal cross-sectional view of the rechargeable battery.

Referring to FIG. 1 and FIG. 2, the rechargeable battery 101 according to the present exemplary embodiment includes an electrode assembly 10, a receiving case 20, an insulation case 70, a cap plate 40, a protective circuit module 30, a first lead tab 36, a second lead tab 37, and a top cover 60. Although the rechargeable battery 101 is illustrated by a square shaped battery by way of example, in other implementations, the rechargeable battery 101 may be one of other various rechargeable battery types, such as a pouch battery, a lithium polymer battery, or the like.

The electrode assembly 10 may include a positive electrode 11 (a first electrode), a negative electrode 12 (a second electrode), and a separator 13 disposed between the positive electrode 11 and the negative electrode 12. The positive electrode 11 may have a long strip shape and may include a positive electrode coating region in which a positive electrode active material layer is formed and a positive electrode uncoated region in which an active material is not coated. The positive electrode uncoated region may be disposed at one end in a length direction of the positive electrode.

The negative electrode 12 may have a long strip shape and may include a negative electrode coating region in which a negative electrode active material layer is formed and a negative electrode uncoated region in which an active material is not coated. The negative electrode uncoated region may be disposed at one end in a length direction of the negative electrode. The positive electrode 11 and the negative electrode 12 may be spiral-wound in a jelly roll structure with the separator 13, which is an insulator, interposed therebetween.

In other implementations, the electrode assembly may be a sequentially stacked structure with the separator interposed between the positive electrode and the negative electrode.

A positive electrode tab 16 (a first tab) may be fixed to the positive electrode 11 and a negative electrode tab 17 (a second tab) may be fixedly installed in the negative electrode 12. The positive electrode tab 16 and the negative electrode tab 17 may be parallel to the winding shaft and may protrude from an upper end of the electrode assembly 10.

The positive electrode tab 16 may be made of an electrically conductive material such as nickel or aluminum and may be electrically connected to the cap plate 40. The negative electrode tab 17 is made of an electrically conductive material such as copper or nickel and may be electrically connected to an inner terminal 45.

Figure 3:
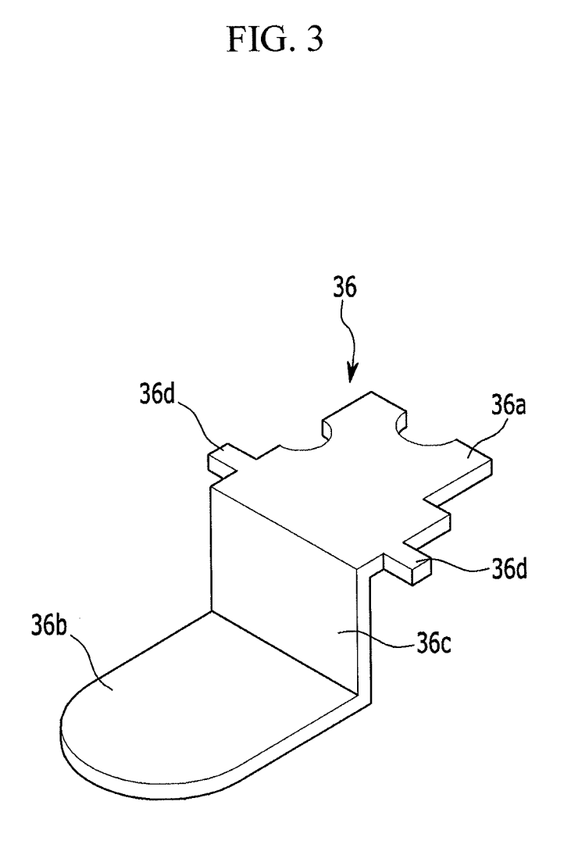
FIG. 3 illustrates a perspective view showing a first lead tab according to the exemplary embodiment.

Referring to FIG. 2 and FIG. 3, the receiving case 20 may have a box shape having an inner space and may have an opening 20a formed at the upper end thereof to receive the electrode assembly 10. The receiving case 20 may provide a space in which the electrode assembly 10 and an electrolyte solution are received. The receiving case 20 may be electrically connected to the positive electrode 11. The receiving case 20 may be made of aluminum or an aluminum alloy and may be manufactured by a deep drawing method.

The insulation case 70 may be between the electrode assembly 10 and the cap plate 40. The insulation case 70 may include a bottom 71 and a supporting rib 72 protruding from the bottom. The insulation case 70 may be inserted and installed in the receiving case 20. The insulation case 70 may include a first tab hole 73 through which the positive electrode tab 16 penetrates and a second tab hole 74 through which the negative tab 17 is penetrates.

The inner terminal 45 may be inserted into a terminal hole 48 formed at the center of the cap plate 40. The inner terminal 45 may be inserted into the terminal hole 48 via an insulation gasket 46. The insulation gasket 46 may electrically insulate the inner terminal 45 and the cap plate 40 from each other while surrounding the circumference of the inner terminal 45.

A connection plate 52 may be below the cap plate 40. The negative electrode tab 17 may be fixed to the connection plate 52 by welding. The connection plate 52 may have a plate shape and may be parallel to the cap plate 40. A terminal hole 52a into which the terminal is inserted may be formed in the connection plate 52.

An insulation plate 51 may be between the cap plate 40 and the connection plate 52. The insulation plate 51 may a plate that provides electrical insulation to insulate the cap plate 40 from the connection plate 52. The insulation plate 51 may be parallel to the cap plate 40. A terminal hole 51a through which the terminal penetrates may be formed in the insulation plate 51.

The inner terminal 45 may penetrate the cap plate 40, the insulation plate 51, and the connection plate 52. Thus, the inner terminal 45 may be electrically connected to the negative electrode 12 via the connection plate 52 and the negative electrode tab 17.

The cap plate 40 may be coupled with the opening 20*a* of the receiving case 20 to seal the receiving case 20. The cap plate 40 may be made of an electrically conductive metal material such as aluminum or aluminum alloy. The positive electrode tab 16 may be connected to the bottom of the cap plate 40 by welding, such that the cap plate 40 is positively charged.

An electrolyte solution injection hole 42 may be formed in the cap plate 40 as a passage for injecting the electrolyte solution into the receiving case 20. A cap 43 may be inserted into the electrolyte solution injection hole 42 to close the electrolyte solution injection hole 42. The terminal hole 48 into which the inner terminal 45 is inserted may be at the center of the cap plate 40.

The protective circuit module 30 controlling the charging and the discharging of the rechargeable battery 101 may be installed on the cap plate 40. The protective circuit module 30 may include a substrate 31 and a plurality of circuit elements 35 mounted on the substrate 31. Four outer terminals 32 may be installed in the protective circuit module 30. The outer terminals 32 may serve as a sensing terminal that transfers the current to the outside and measures the current and the voltage of the rechargeable battery.

The protective circuit module 30 may include a terminal connection member 34 attached to the inner terminal 45. The terminal connection member 34 may be fixed on the top surface of the inner terminal 45 by welding. A fuse part having a cross-section smaller than that of the periphery thereof may be formed in the terminal connection member 34, and an insulation member 34*a* may be formed as a coating on the fuse part.

The protective circuit module 30 may be electrically connected to the cap plate 40 by way of the first lead tab 36 and the second lead tab 37. The first lead tab 36 may be fixed at one end in the length direction of the protective circuit module 30 and the second lead tab 37 may be fixed at the other end in the length direction of the protective circuit module 30.

Figure 4:
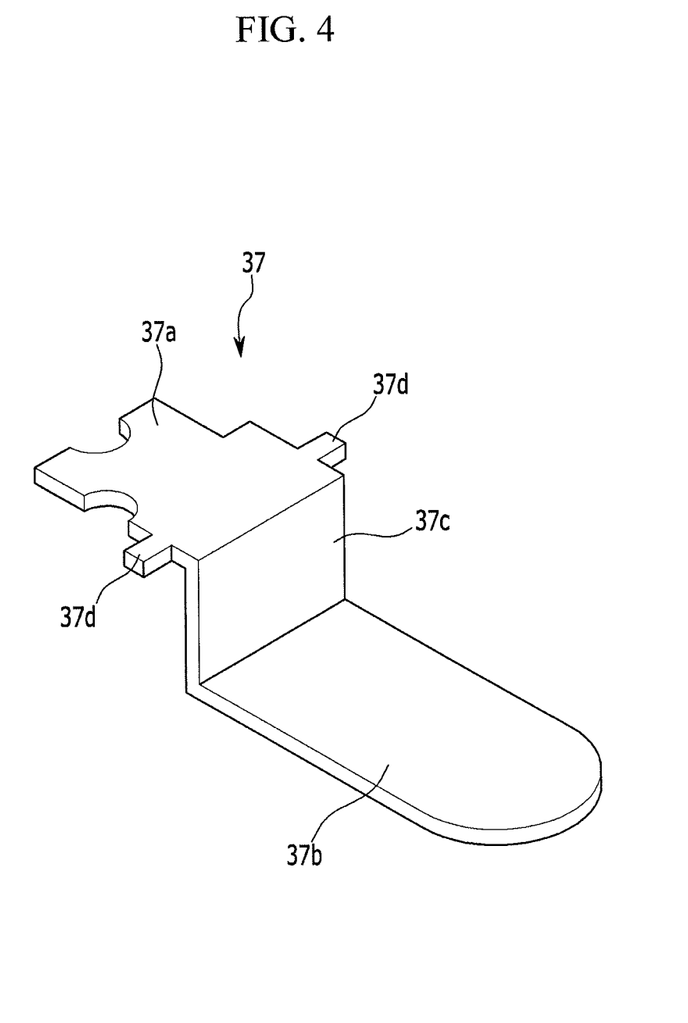
FIG. 4 illustrates a perspective view showing a second lead tab according to the exemplary embodiment.

FIG. 3 illustrates a perspective view showing a first lead tab according to the exemplary embodiment, and FIG. 4 illustrates a perspective view showing a second lead tab according to the exemplary embodiment.

Referring to FIG. 3 and FIG. 4, the first lead tab 36 may include an upper bonding part 36*a* attached to the protective circuit module 30, a lower bonding part 36*b* fixed on the cap plate 40, and a connection plate 36*c* bent downwardly from the upper bonding part 36*a* to connect the upper bonding part 36*a* and the lower bonding part 36*b*. Herein, the term "downwardly" refers generally to a direction from the supporting plate 61 of the cover 60 (described below) to the top surface of the cap plate 40.

The first lead tab 36 may be fixed at one end in a length direction of the substrate 31 of the protective circuit module 30. The lower bonding part 36*b* may protrude in the length direction from the protective circuit module 30.

The upper bonding part 36*a* may be bonded to the substrate 31 by welding in a state in which the upper bonding part 36*a* is disposed parallel to the substrate 31. The lower bonding part 36*b* may be bonded to the cap plate 40 by welding.

The connection plate 36*c* may be vertically bent from the upper bonding part 36*a* to the lower bonding part 36*b* to connect the upper bonding part 36*a* and the lower bonding part 36*b*.

Fixing protrusions 36*d* may protrude in a width direction at both sides of the upper bonding part 36*a*. The fixing protrusions 36*d* may be inserted into fixing grooves 65 formed in the top cover 60. The fixing protrusions 36*d* may help prevent the top cover 60 from being separated from the cap plate 40.

As shown in FIG. 4, the second lead tab 37 may include an upper bonding part 37*a* attached to the protective circuit module 30, a lower bonding part 37*b* fixed on the cap plate 40, and a connection plate 37*c* bent downwardly from the upper bonding part 37*a* to connect the upper bonding part 37*a* and the lower bonding part 37*b*.

The second lead tab 37 may be fixed at the other end in the length direction of the substrate 31. The lower bonding part 37*b* may protrude in the length direction from the protective circuit module 30.

The upper bonding part 37*a* may be bonded to the substrate 31 by welding in a state in which the upper bonding part 37*a* is disposed parallel to the substrate 31. The lower bonding part 37*b* may be bonded to the cap plate 40 by welding. The connection plate 37*c* may be vertically bent from the upper bonding part 37*a* to the lower bonding part 37*b* to connect the upper bonding part 37*a* and the lower bonding part 37*b*.

Fixing protrusions 37*d* may protrude in a width direction at both sides of the upper bonding part 37*a*. The fixing protrusions 37*d* may be inserted into the fixing grooves 65 formed in the top cover 60. The fixing protrusions 37*d* may prevent the top cover 60 from being separated from the cap plate 40.

Figure 5:
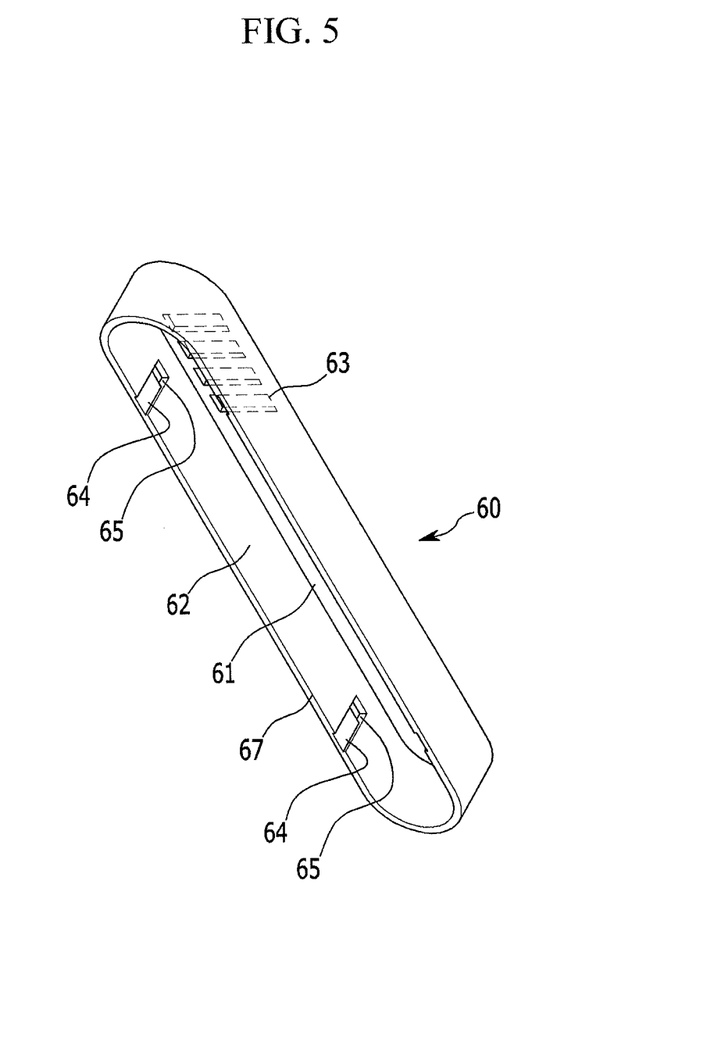
FIG. 5 illustrates a perspective view seen from below of a top cover according to the exemplary embodiment.

FIG. 5 illustrates a perspective view seen from below of a top cover according to this exemplary embodiment.

Referring to FIG. 5, the top cover 60 enclosing the protective circuit module 30 may be installed on the cap plate 40. The top cover 60 may include a supporting plate 61 and a side wall 62 protruding downwardly from the side end of the supporting plate 61. An opened aperture 67 may be at the bottom end of the top cover 60.

The top cover 60 may be disposed on the cap plate 40, and the protective circuit module 30 may be disposed between the cap plate 40 and the top cover 60. A plurality of terminal holes 63 may be formed in the top cover 60 such that the outer terminals 32 may be exposed.

The side wall 62 may be provided with the fixing grooves 65 into which the fixing protrusions 36*d* and 37*d* are inserted. The fixing grooves 65 may be formed in the sidewall 62 facing each other and may be spaced by a predetermined distance from the bottom end of the top cover 60. The sidewall 62 may include guide grooves 64, each of the guide grooves being connected with one of the fixing grooves 65. The guide grooves 64 may extend up from the bottom end of the sidewall 62. The guide grooves 64 may extend from the aperture 67 as guides such that the fixing protrusions 36*d* and 37*d* may be easily inserted thereinto.

The sidewall 62 may include the fixing grooves 65 into which the fixing protrusions 36*d* formed in the first lead tab 36 and the fixing protrusions 37*d* formed in the second lead tab 37 are inserted.

Figure 6:
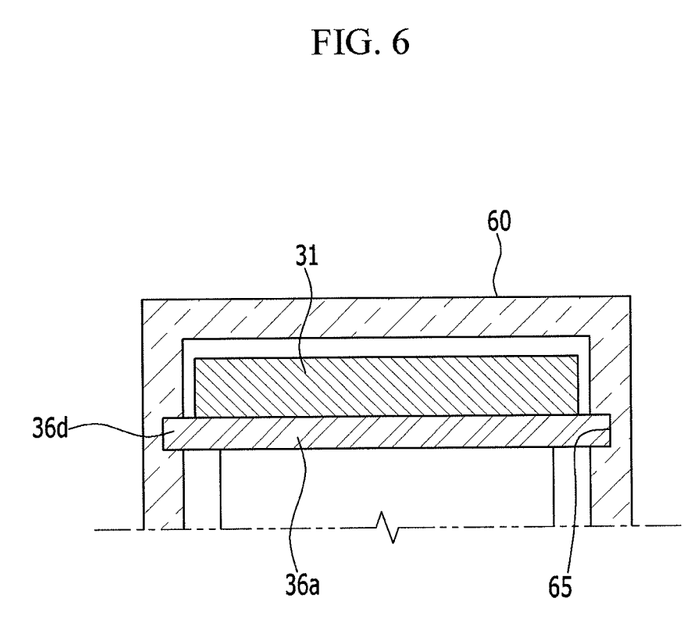
FIG. 6 illustrates a cross-sectional view showing a state in which a lead tab and a top cover are coupled with each other according to the exemplary embodiment.

As shown in FIG. 6, according to the present exemplary embodiment, the first lead tab 36 and the second lead tab 37 may include the fixing protrusions 36*d* and 37*d*, respectively, and the top cover 60 may include the fixing grooves 65 into which the fixing protrusions 36*d* and 37*d* are inserted. The top cover 60 may be stably fixed on the cap plate 40 by the combination of the fixing protrusions 36*d* and 37*d* and the fixing grooves 65.

Figure 7:
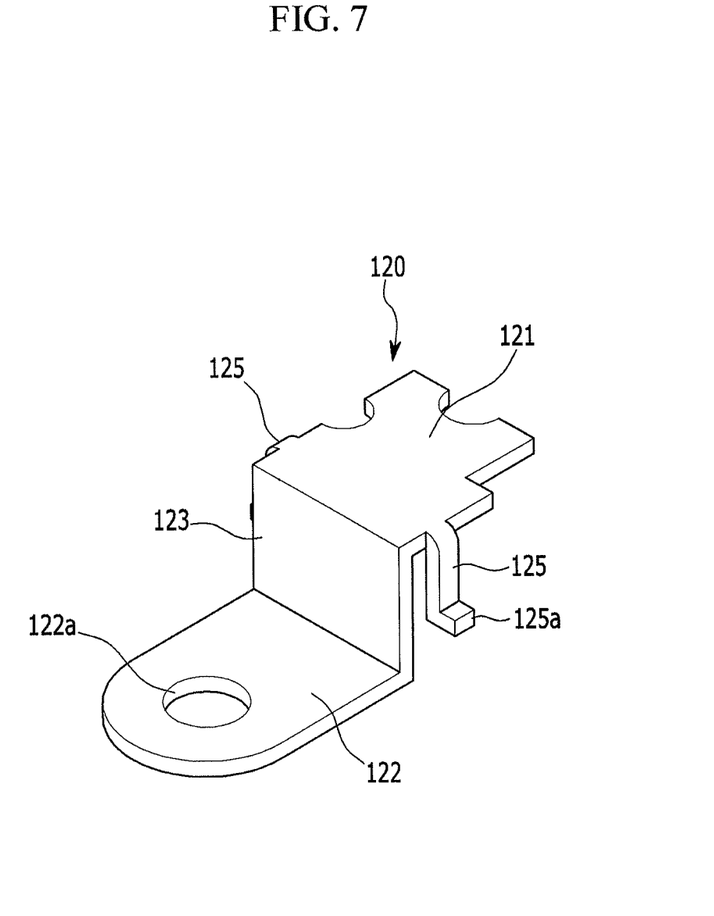
FIG. 7 illustrates a perspective view showing a first lead tab according to another exemplary embodiment.
Figure 8:
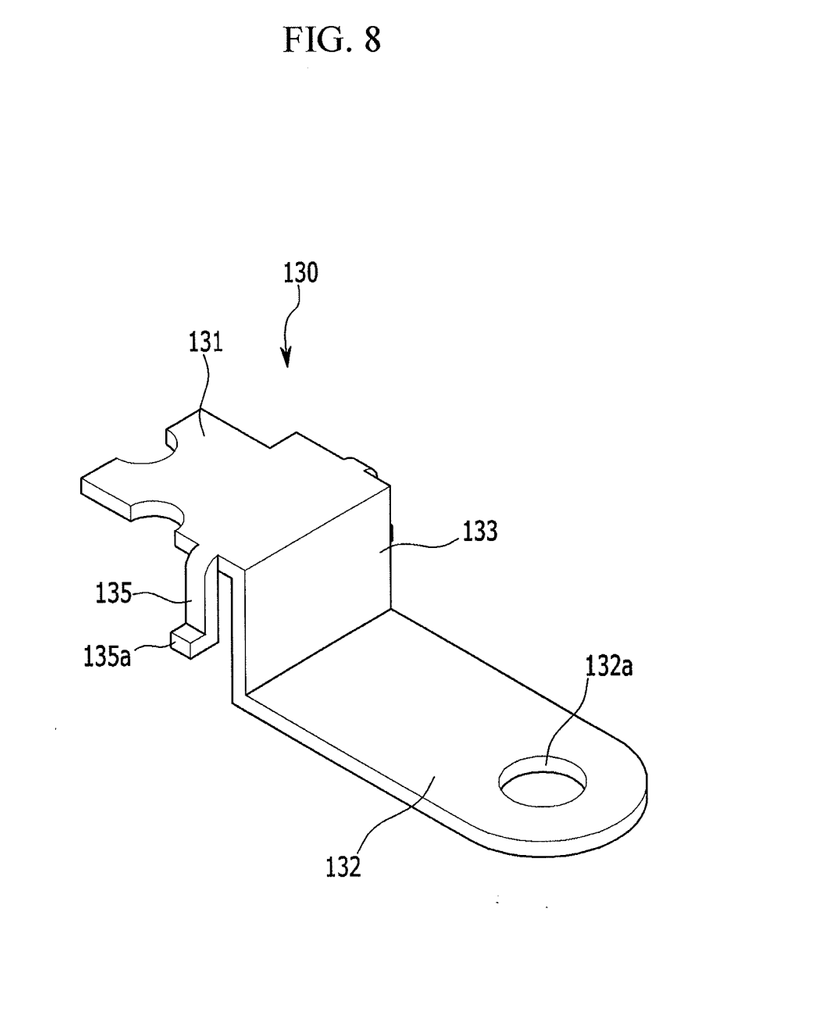
FIG. 8 illustrates a perspective view showing a second lead tab according to the exemplary embodiment illustrated in FIG. 7.

FIG. 7 illustrates a perspective view showing a first lead tab according to another exemplary embodiment, and FIG. 8 illustrates a perspective view showing a second lead tab according to this exemplary embodiment.

Referring to FIG. 7 and FIG. 8, the rechargeable battery according to this exemplary embodiment has the same configuration as the rechargeable battery according to the previous exemplary embodiment except for the structure of the lead tab and the top cover. Therefore, a detailed description thereof will not be repeated.

The first lead tab 120 may include an upper bonding part 121 attached to the protective circuit module 30, a lower bonding part 122 fixed on the cap plate 40, and a connection plate 123 bent downwardly from the upper bonding part 121 to connect the upper bonding part 121 and the lower bonding part 122.

The first lead tab 120 may be fixed at one end in the length direction of the substrate 31 of the protective circuit module 30. The lower bonding part 122 may protrude in the length direction of the substrate 31 from the protective circuit module 30.

The upper bonding part 121 may be bonded to the substrate 31 by welding in a state in which the upper bonding part 121 is parallel to the substrate 31. The lower bonding part 122 may include a screw hole 122a into which a screw is insertable. The lower bonding part 122 may be fixed via the screw to the cap plate 40. The connection plate 123 may be vertically bent from the upper bonding part 121 to the lower bonding part 122 to connect the upper bonding part 121 and the lower bonding part 122.

The upper bonding part 121 may include a buffering member 125 spaced apart from the top surface of the cap plate 40 while extending toward the cap plate 40. The buffering member 125 may have a bar shape extending downwardly from both side ends in the width direction of the upper bonding part 121. The buffering member 125 may include a fixing protrusion 125a that protrudes from the bottom end of the buffering member 125. The fixing protrusion 125a may be inserted into the fixing groove of the top cover 60.

As shown in FIG. 8, the second lead tab 130 may include an upper bonding part 131 attached to the protective circuit module 30, a lower bonding part 132 fixed on the cap plate 40, and a connection plate 133 bent downwardly from the upper bonding part 131 to connect the upper bonding part 131 and the lower bonding part 132.

The second lead tab 130 may be fixed at the other end in the length direction of the substrate 31. The lower bonding part 132 may protrude in the length direction of the substrate 31 from the protective circuit module 30.

The upper bonding part 131 may be bonded to the substrate 31 by welding in a state in which the upper bonding part 131 is parallel to the substrate 31. The lower bonding part 132 may include a screw hole 132a into which a screw is insertable. The lower bonding part 132 may be fixed via the screw to the cap plate 40. The connection plate 133 may be vertically bent from the upper bonding part 131 to the lower bonding part 132 to connect the upper bonding part 131 and the lower bonding part 132.

The upper bonding part 131 may include a buffering member 135 that is spaced apart from the top surface of the cap plate 40 while extending toward the cap plate 40. The buffering member 135 may extend downwardly from both side ends in the width direction of the upper bonding part 131. The buffering member may include a fixing protrusion 135a that protrudes from the bottom end of the buffering member 135. The fixing protrusion 135a may be inserted into the fixing groove 165 of the top cover 160.

Figure 9:
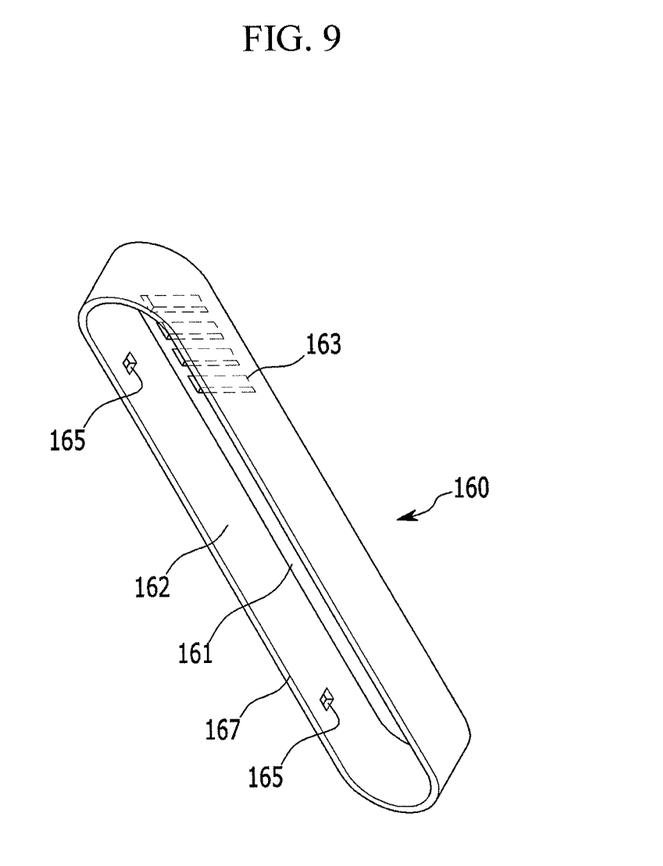
FIG. 9 illustrates a perspective view seen from below of a top cover according to the exemplary embodiment illustrated in FIG. 7.

FIG. 9 illustrates a perspective view seen from below of a top cover according to this exemplary embodiment.

Referring to FIG. 9, the top cover 160 enclosing the protective circuit module 30 may be installed on the cap plate 40. The top cover 160 may include a supporting plate 161 and a sidewall 162 protruding downwardly from the side end of the supporting plate 161. An opened aperture 167 may be at the bottom end of the top cover 160.

The top cover 160 may be disposed on the cap plate 40, and the protective circuit module 30 may be between the cap plate 40 and the top cover 160. A plurality of terminal holes 163 may be formed in the top cover 160 such that the outer terminals 32 may be exposed.

The sidewall 162 may include fixing grooves 165 into which the fixing protrusions 125a and 135a are inserted. The fixing grooves 165 may be formed in the sidewall 162 facing each other and may be disposed to be spaced by a predetermined distance from the aperture 167 formed at the bottom end of the top cover 160.

The sidewall 162 may be provided with the fixing grooves 165 into which the fixing protrusions 125a formed in the first lead tab 120 and the fixing protrusions 135a formed in the second lead tab 130 are inserted.

Figure 10:
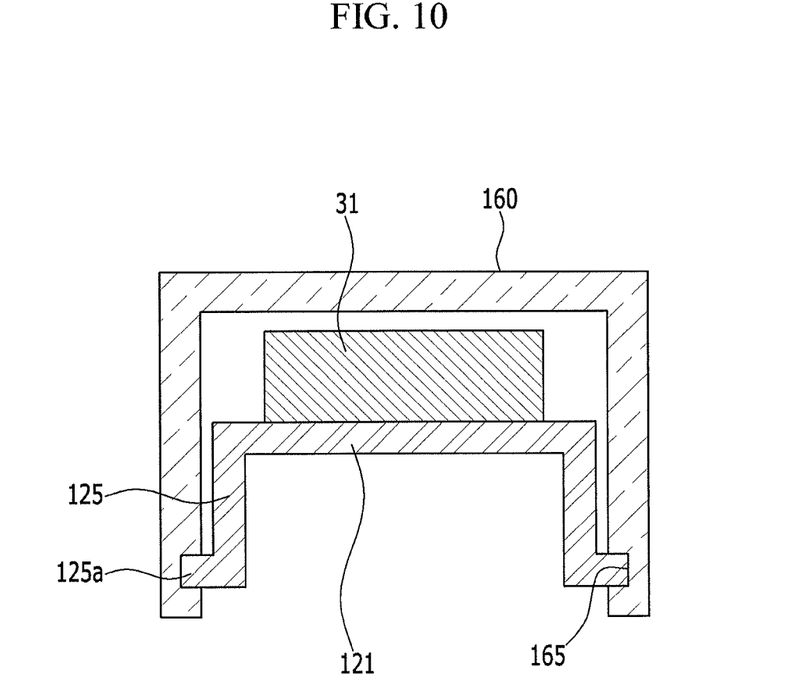
FIG. 10 illustrates a cross-sectional view showing a state in which a lead tab and a top cover are coupled with each other according to the exemplary embodiment illustrated in FIG. 7.

As shown in FIG. 10, according to the present exemplary embodiment, when an impact is applied to the rechargeable battery due to dropping of the rechargeable battery or the like, the buffering members 125 and 135 may support the lead tabs 120 and 130. It may be possible to prevent the lead tabs 120 and 130 from being separated from the substrate 31.

The first lead tab 120 and the second lead tab 130 may include the protrusions 125a and 135a, respectively, and the top cover 160 may include the fixing grooves 165 into which the protrusions 125a and 135a are inserted. The top cover 160 may be stably fixed on the cap plate 40 by the combination of the fixing protrusions 125a and 135a and the fixing grooves 165.

Figure 11:
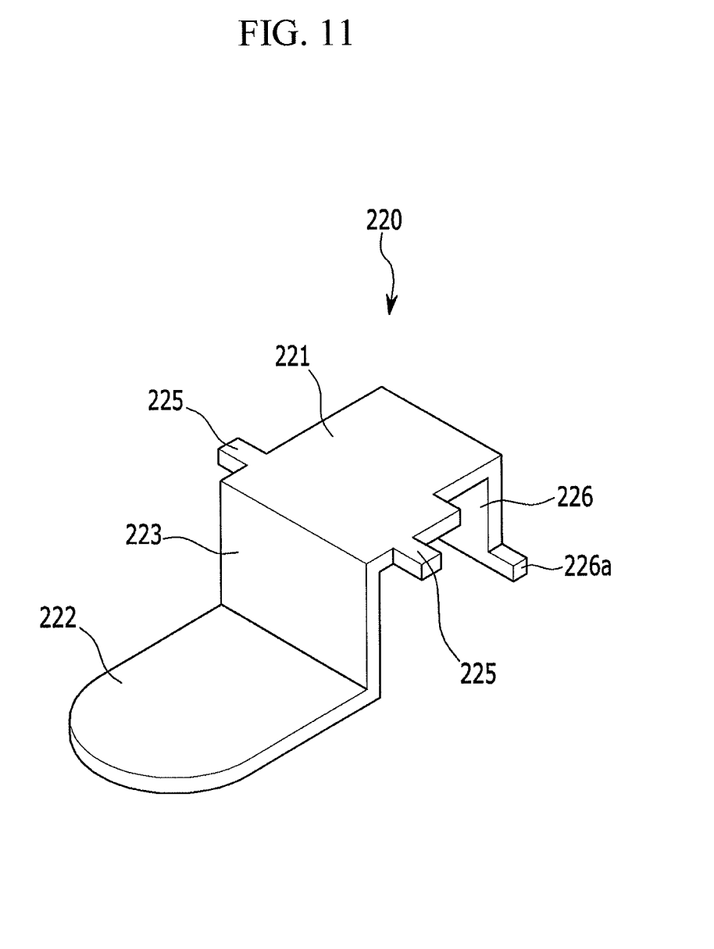
FIG. 11 illustrates a perspective view showing a first lead tab according to another exemplary embodiment.
Figure 12:
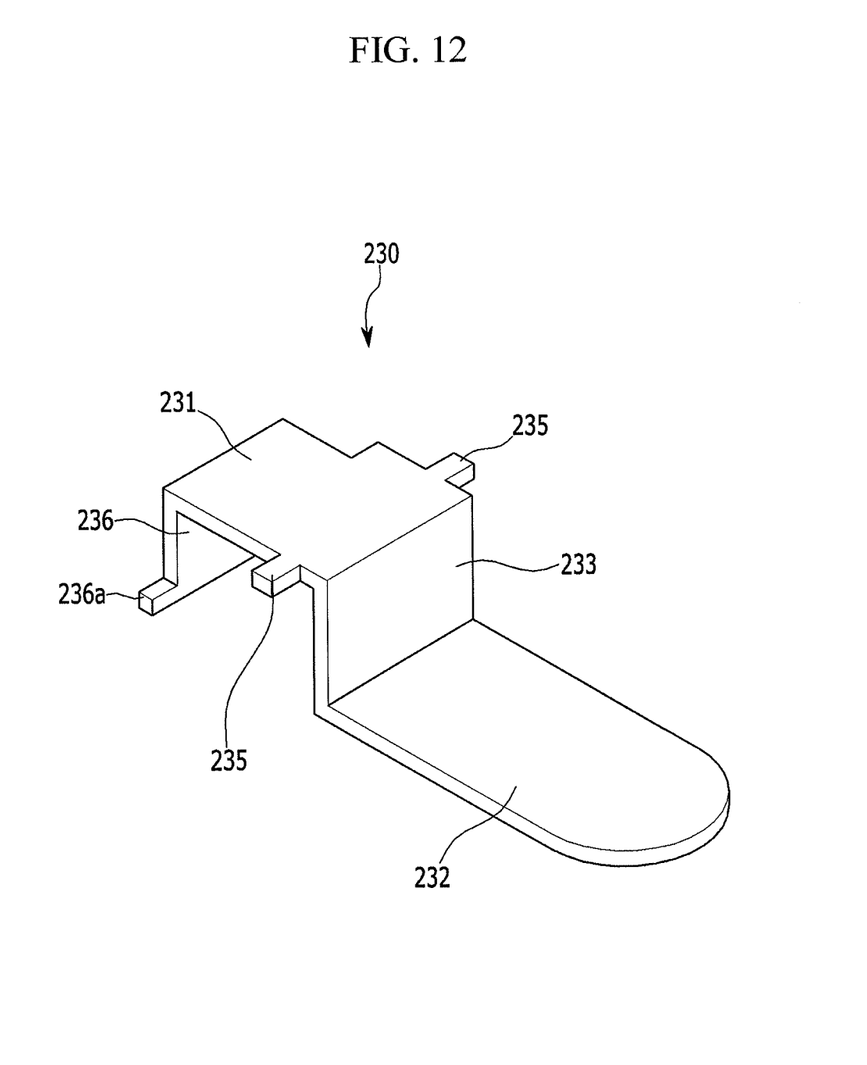
FIG. 12 illustrates a perspective view showing a second lead tab according to the exemplary embodiment illustrated in FIG. 11.

FIG. 11 illustrates a perspective view showing a first lead tab according to another exemplary embodiment, and FIG. 12 illustrates a perspective view showing a second lead tab according to this exemplary embodiment.

Referring to FIG. 11 and FIG. 12, the rechargeable battery according to this exemplary embodiment has the same configuration as the rechargeable battery according to the exemplary embodiment illustrated in FIG. 1, except for the structures of the lead tab and the top cover. Therefore, a detailed description thereof will not be repeated.

The first lead tab 220 may include an upper bonding part 221 attached to the protective circuit module 30, a lower bonding part 222 fixed on the cap plate 40, a connection plate 223 bent downwardly from the upper bonding part 221 to connect the upper bonding part 221 and the lower bonding part 222, and a buffering member 226 that is bent toward the cap plate 40 from the upper bonding part 221.

The first lead tab 220 may be fixed at one end in the length direction of the substrate 31 of the protective circuit module 30. The lower bonding part 222 may protrude in the length direction of the substrate 31 from the protective circuit module 30.

The upper bonding part 221 may be bonded to the substrate 31 by welding in a state in which the upper bonding part 221 is disposed in parallel with the substrate 31. The lower bonding part 222 may be bonded on the cap plate 40 by welding. The connection plate 223 may be vertically bent from the upper bonding part 221 to the lower bonding part 222 to connect the upper bonding part 221 and the lower bonding part 222.

The buffering member 226 may have a plate shape bent toward the cap plate 40 from the end of the upper bonding part 221. The buffering member 226 may be parallel to the connection plate 223. The bottom end of the buffering member 226 may be spaced apart from the top surface of the cap plate

40. The buffering member 226 may be connected to one end of the upper bonding part 221, and the connection plate 223 may be connected to the other end of the upper bonding part 221.

First fixing protrusions 225 may protrude in a width direction at both side ends of the upper bonding part 221. Second fixing protrusions 226a may protrude in a width direction from both side ends of the buffering member 226.

As shown in FIG. 12, the second lead tab 230 may include an upper bonding part 231 attached to the protective circuit module 30, a lower bonding part 232 fixed on the cap plate 40, a connection plate 233 bent downwardly from the upper bonding part 231 to connect the upper bonding part 231 and the lower bonding part 232, and a buffering member 236 that is bent toward the cap plate 40 from the upper bonding part 231.

The second lead tab 230 may be fixed at the other end in the length direction of the substrate 31. The lower bonding part 232 may protrude in the length direction of the substrate 31 from the protective circuit module 30.

The upper bonding part 231 may be bonded to the substrate 31 by welding in a state in which the upper bonding part 231 is parallel to the substrate 31. The lower bonding part 232 may be bonded on the cap plate 40 by the welding. The connection plate 233 may be vertically bent from the upper bonding part 231 to the lower bonding part 232 to connect the upper bonding part 231 and the lower bonding part 232.

The buffering member 236 may be bent toward the cap plate 40 from the end of the upper bonding part 231. The buffering member 236 may be parallel to the connection plate 233. The bottom end of the buffering member 236 may be spaced apart from the top surface of the cap plate 40. The buffering member 236 may be connected to one end of the upper bonding part 231, and the connection plate 233 may be connected to the other end of the upper bonding part 231.

First fixing protrusions 235 may protrude in a width direction from both side ends of the upper bonding part 231. Second fixing protrusions 236a may protrude in a width direction from both side ends of the buffering member 236.

Figure 13:
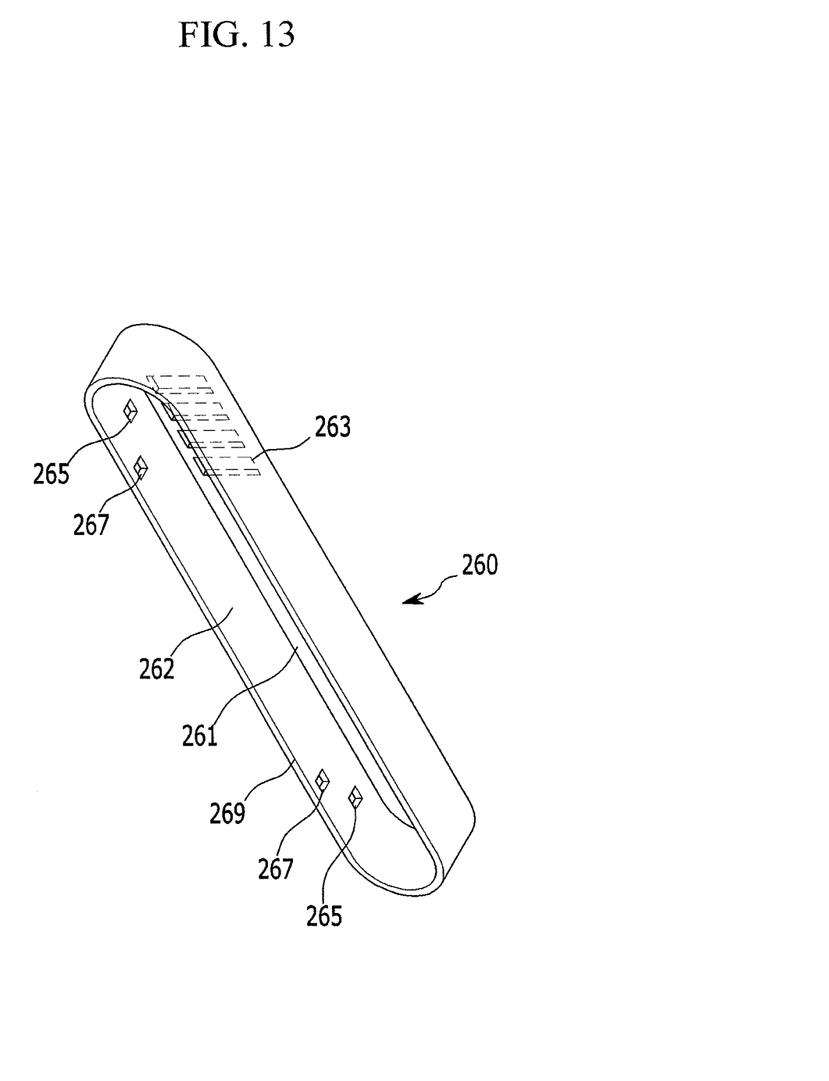
FIG. 13 illustrates a perspective view seen from below of a top cover according to the exemplary embodiment illustrated in FIG. 11.

FIG. 13 illustrates a perspective view seen from below a top cover according to this exemplary embodiment.

Referring to FIG. 13, the top cover 260 enclosing the protective circuit module 30 may be installed on the cap plate 40. The top cover 260 may include a supporting plate 261 and a sidewall 262 protruding downwardly from the side end of the supporting plate 261. An opened aperture 269 may be at the bottom end of the top cover 260.

The top cover 260 may disposed on the cap plate 40, and the protective circuit module 30 may be between the cap plate 40 and the top cover 260. A plurality of terminal holes 263 may be formed in the top cover 260 such that the outer terminals 32 may be exposed.

The sidewall 262 may include first fixing grooves 265 into which the first fixing protrusions 225 and 235 are inserted and second fixing grooves 267 into which the second protrusions 226a and 236a are inserted.

The first fixing grooves 265 and the second fixing grooves 267 may face each other in the sidewall 162. The first fixing grooves 265 may be formed above the second fixing grooves 267. The first fixing grooves 265 may be disposed outwardly from the second fixing grooves 267 based on the length direction of the top cover 260.

The first fixing protrusions 225 and 235 may be inserted into the first fixing grooves 265, respectively, to support the top cover 260, and the second fixing protrusions 226a and 236a may be inserted into the second fixing grooves 267, respectively, to support the top cover 260.

When an impact is applied to the rechargeable battery due to the dropping of the rechargeable battery or the like, the buffering members 125 and 135 may alleviate the impact by supporting the lead tabs 120 and 130. It may be possible to prevent the lead tabs 120 and 130 from being separated from the substrate 31.

By way of summation and review, a rechargeable battery may be provided with a protective circuit module controlling current and voltage and a top cover covering the protective circuit module. Generally, in order to fix the top cover to a case or a cap plate, a separate holder may be used. The use of such a separate holder may cause may increase the manufacturing cost as well as increasing the volume and weight of the rechargeable battery.

Embodiments provide a rechargeable battery in which a top cover may be stably fixed without a separate holder.

Embodiments may also provide a rechargeable battery in which a contact failure between a lead tab and a protective circuit module due to an impact may be prevented or avoided.

According to embodiments, a fixing protrusion of a lead tab may be inserted into a fixing groove of the top cover, such that the top cover may be stably fixed on the cap plate.

According to embodiments, buffering members protrude downwardly toward the cap plate and are spaced apart from the cap plate may be formed in the lead tab. When an impact is applied from the outside, the buffering members may help to prevent a contact failure between the lead tab and the substrate. Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A rechargeable battery, comprising:
   an electrode assembly including a first electrode, a second electrode, and a separator, the separator being between the first electrode and the second electrode;
   a case including a space that receives the electrode assembly therein;
   a cap plate coupled with an opening of the case;
   a top cover covering the cap plate;
   a protective circuit module between the cap plate and the top cover; and
   a lead tab that electrically connects the protective circuit module and the cap plate,
   wherein the lead tab includes fixing protrusions connected to sides of the lead tab, and the top cover includes fixing grooves into which the fixing protrusions are inserted.

2. The rechargeable battery as claimed in claim 1, wherein the lead tab includes an upper bonding part attached to the protective circuit module, a lower bonding part fixed on the cap plate, and a connection plate bent downwardly from the upper bonding part to connect the upper bonding part and the lower bonding part.

3. The rechargeable battery as claimed in claim 2, wherein the fixing protrusions protrude at side ends of the upper bonding part.

4. The rechargeable battery as claimed in claim 2, wherein the lead tab includes buffering members that extend toward the cap plate from side ends of the upper bonding part, the buffering members being spaced apart from a top surface of the cap plate.

5. The rechargeable battery as claimed in claim 4, wherein the fixing protrusions protrude from the buffering members.

6. The rechargeable battery as claimed in claim 2, wherein:
the lead tab includes a buffering member that is bent toward the cap plate from an end of the upper bonding part and that is spaced apart from a top surface of the cap plate, and
the fixing protrusions protrude from side ends of the buffering member.

7. The rechargeable battery as claimed in claim 2, wherein:
the top cover includes a supporting plate and a sidewall protruding toward the cap plate from the supporting plate, and
the fixing grooves are in the sidewall.

8. The rechargeable battery as claimed in claim 7, wherein the sidewall includes guide grooves that are connected with the fixing grooves and extend to a bottom end of the sidewall.

9. The rechargeable battery as claimed in claim 7, wherein:
the protective circuit module includes a plurality of outer terminals, and
the top cover includes a plurality of holes exposing the outer terminals.

10. The rechargeable battery as claimed in claim 7, wherein:
the lead tab includes a buffering member that is bent toward the cap plate from an end of the upper bonding part,
the lead tab includes first fixing protrusions that protrude from the upper bonding part and second fixing protrusions that protrude from the buffering members, and
the sidewall includes first fixing grooves into which the first fixing protrusions are inserted and second fixing grooves into which the second fixing protrusions are inserted.

11. The rechargeable battery as claimed in claim 2, wherein the lower bonding part is welded to the cap plate.

12. The rechargeable battery as claimed in claim 2, wherein the lower bonding part includes a screw hole into which a screw is insertable.

13. The rechargeable battery as claimed in claim 2, wherein an insulation case is between the electrode assembly and the cap plate.

14. A rechargeable battery, comprising:
an electrode assembly including a first electrode, a second electrode, and a separator, the separator being between the first electrode and the second electrode;
a case including a space that receives the electrode assembly therein;
a cap plate coupled with an opening of the case;
a top cover covering the cap plate;
a protective circuit module between the cap plate and the top cover; and
a lead tab that electrically connects the protective circuit module and the cap plate, the lead tab including a buffering member that protrudes and extends toward the cap plate, the buffering member being spaced apart from a top surface of the cap plate and including a fixing protrusion protruding from a bottom end of the buffering member,
wherein the top cover includes a fixing groove into which the fixing protrusion is inserted.

15. The rechargeable battery as claimed in claim 14, wherein:
the lead tab includes an upper bonding part attached to the protective circuit module, a lower bonding part fixed on the cap plate, and a connection plate bent downwardly from the upper bonding part to connect the upper bonding part and the lower bonding part, and
the buffering member is plural in number, each buffering member having a bar shape and extending toward the cap plate from a respective side end of the upper bonding part.

16. The rechargeable battery as claimed in claim 14, wherein:
the lead tab includes an upper bonding part attached to the protective circuit module, a lower bonding part fixed on the cap plate, and a connection plate bent downwardly from the upper bonding part to connect the upper bonding part and the lower bonding part, and
the buffering member has a plate shape, the buffering member being bent toward the cap plate from an end of the upper bonding part.

* * * * *